US007916633B2

(12) United States Patent
McGregor

(10) Patent No.: US 7,916,633 B2
(45) Date of Patent: Mar. 29, 2011

(54) VARIABLE RESPONSE MESSAGE LENGTH FOR MASTER-SLAVE COMMUNICATIONS

(75) Inventor: Marlin McGregor, Berwyn, PA (US)

(73) Assignee: General Instrument Corporation, Horsham, PA (US)

( * ) Notice: Subject to any disclaimer, the term of this patent is extended or adjusted under 35 U.S.C. 154(b) by 1072 days.

(21) Appl. No.: 10/864,942

(22) Filed: Jun. 10, 2004

(65) Prior Publication Data

US 2005/0180458 A1 Aug. 18, 2005

Related U.S. Application Data

(60) Provisional application No. 60/544,173, filed on Feb. 12, 2004.

(51) Int. Cl.
*G06F 15/16* (2006.01)

(52) U.S. Cl. .......................... 370/230; 370/468; 709/208

(58) Field of Classification Search .................. 370/229, 370/230, 253, 254, 468, 389, 392, 470–474; 709/208
See application file for complete search history.

(56) References Cited

U.S. PATENT DOCUMENTS

| 5,303,227 | A | * | 4/1994 | Herold et al. ................. 370/276 |
| 5,463,382 | A | * | 10/1995 | Nikas et al. ................... 340/7.22 |
| 5,528,605 | A | * | 6/1996 | Ywoskus et al. ............. 714/749 |
| 6,529,504 | B1 | * | 3/2003 | Sbisa ............................ 370/385 |

* cited by examiner

*Primary Examiner* — Seema S Rao
*Assistant Examiner* — Mon Cheri S Davenport
(74) *Attorney, Agent, or Firm* — Stewart M. Wiener

(57) ABSTRACT

A method for sending a variable length response message in a master-slave communication system begins by issuing a command from a master device to a slave device. A response message is generated by the slave device. The length of the response message is determined by the slave device and is communicated from the slave device to the master device. The master device requests the rest of the response message from the slave device, and the slave device then sends the rest of the response message to the master device.

6 Claims, 2 Drawing Sheets

VARIABLE RESPONSE MESSAGE LENGTH FOR MASTER-SLAVE COMMUNICATIONS

CROSS REFERENCE TO RELATED APPLICATION(S)

This application claims priority from U.S. Provisional Application No. 60/544,173, filed Feb. 12, 2004, which is incorporated by reference as if fully set forth herein.

FIELD OF INVENTION

The present invention relates to master-slave communications, and more particularly, to a variable length response message for improving data throughput.

BACKGROUND

In a typical communications setting involving a master device and one or more slave devices (i.e., master-slave communications), the slave device's responses to data request messages are of a fixed length. The response therefore may contain irrelevant data that causes unnecessary bus traffic, thus slowing down data throughput in the system.

It is desirable to use a variable length response message, which allows the slave device to respond with only the necessary, meaningful data required to provide an appropriate response to the master device, eliminating unnecessary bus traffic and improving data throughput capacity.

SUMMARY

A method for sending a variable length response message in a master-slave communication system begins by issuing a command from a master device to a slave device. A response message is generated by the slave device. The length of the response message is determined by the slave device and is communicated from the slave device to the master device. The master device requests the rest of the response message from the slave device, and the slave device then sends the rest of the response message to the master device.

A system for sending a variable length response message in a master-slave communication system includes a master device and at least one slave device. Each slave device includes a parameter list for storing a list of parameters monitored by the slave device. The length of the response message is determined by the number of parameters that have changed.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Figure 1:
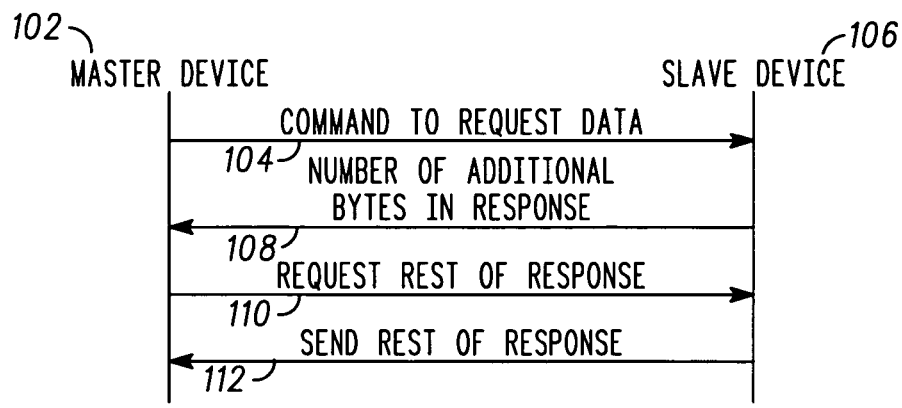
FIG. 1 is a diagram showing an overview of a master-slave communication in accordance with an embodiment of the present invention.

An overview of a master-slave communication in accordance with one embodiment of the present invention is shown in FIG. 1. First, the master device 102 sends a command 104 to the slave device 106 to request data. The command 104 may contain information such as a device identification, a command type, a checksum, and any other necessary communication data. Upon receipt of the command 104, the slave device 106 replies with data 108 informing the master device 102 how many additional bytes are contained in the response. Then, the master device 102 requests the rest of the response message 110 from the slave device 106. The slave device 106 sends the rest of the response message 112 to the master device 102.

Figure 2:
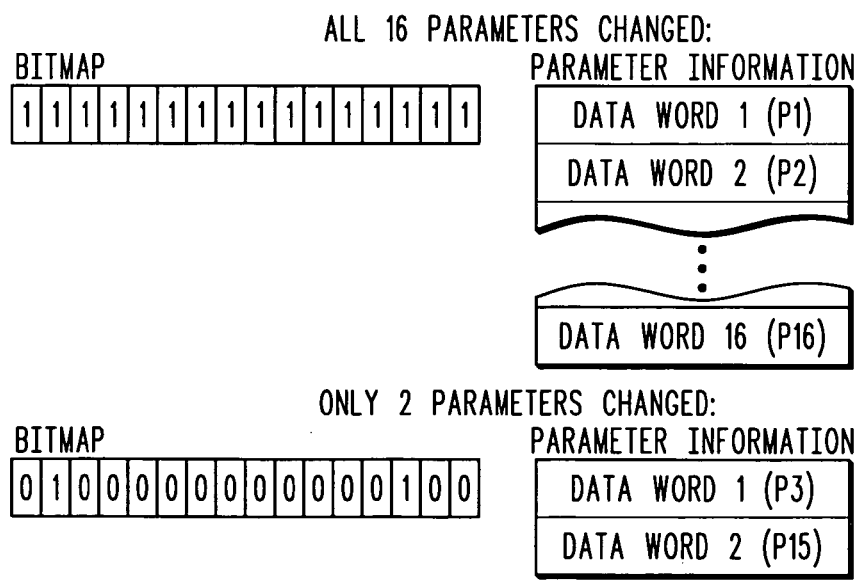
FIG. 2 shows two examples of bit maps and corresponding parameter information in accordance with an embodiment of the present invention.

An exemplary use of this type of communication is for polling a module's status from a slave device. The module may monitor data for several parameters and provide data for the master device to interpret or forward to a higher-level master device. As shown in FIG. 2, the slave device maintains a bit map with information on which parameters have changed. Only the parameters that have changed would have data in the response message.

For purposes of this example, it is assumed that there are a maximum of 16 parameters. If all 16 parameters are changed, then the bit map would indicate this information (shown as all ones) and the corresponding parameter list would contain 16 parameters. If, however, only two parameters are changed, then the bit map and the parameter list would each would contain only two entries. By limiting the response message length to only relevant data (i.e., to only the two parameters that were changed in the latter example), the master device can poll the next module sooner. Because the number of parameters monitored by a slave device is not limited, the savings illustrated by this example can be extrapolated in situations where the number of parameters monitored becomes large.

The variable response message length disclosed herein can be used in any communication protocol where a master device and at least one slave device communicate. The modules communicate on a backplane communications bus (serial peripheral interface (SPI)), using of the following signals:

TABLE 1

Communication Signals

| Signal Name | Description |
|---|---|
| /SS | Slave Select |
| SCLK | Clock |
| MOSI / RX | Serial Data (Master Out, Slave In / UART RX) |
| MISO / TX | Serial Data (Master In, Slave Out / UART TX) |

In one embodiment, the modules operate with the following electrical and timing specifications. It is noted that these specifications may be changed without altering the operation of the present invention.

TABLE 2

Electrical and Timing Specifications

| Characteristic | Nominal | Min | Max | Unit |
|---|---|---|---|---|
| /SS, MOSI, MISO and SCLK Voltage High (SPIVH) | 5 | 2.0 | 7 | V |
| /SS, MOSI, MISO and SCLK Voltage Low (SPIVL) | | | 0.5 | V |
| Backplane SPI Data Rate | 1 | | | MHz |
| Time Between Data Bytes | | 100 | | usec |
| Command to Response Delay | 5 | | | mSec |

TABLE 2-continued

Electrical and Timing Specifications

| Characteristic | Nominal | Min | Max | Unit |
|---|---|---|---|---|
| SPI Transfer Timeout (STT) | 2 | | | mSec |
| Time Between Messages | | 100 | | mSec |

Figure 3:
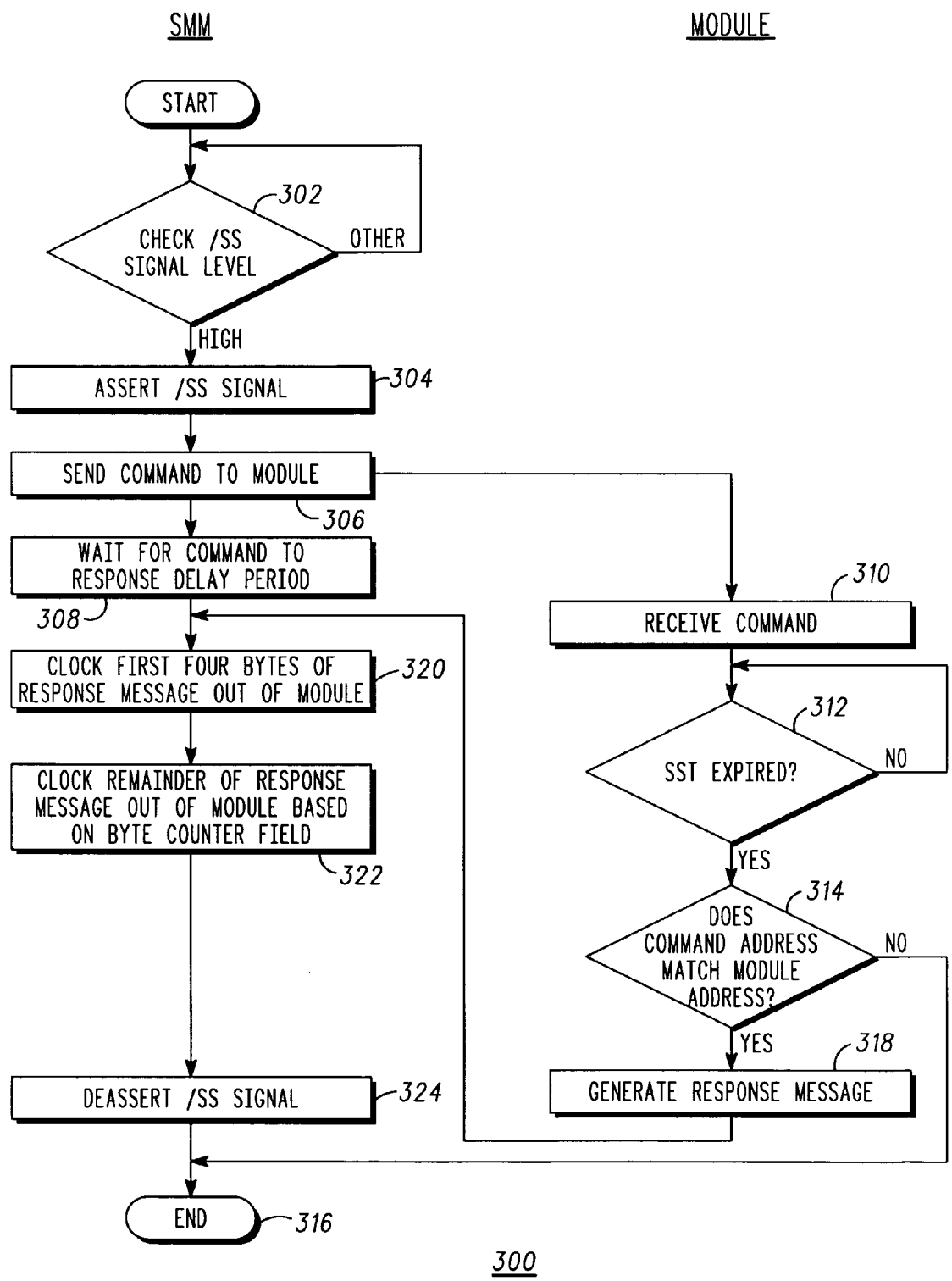
FIG. 3 is a flowchart of a method for exchanging messages between devices in accordance with an embodiment of the present invention.

FIG. 3 shows a method 300 for exchanging messages between a status monitor module (SMM) and other modules in the system. The SMM acts as the bus master and initiates all of the communications on the backplane. The other modules act as SPI slave devices. To simplify discussion of the method 300, it is assumed that there is only one module communicating with the SMM. In operation, many modules can communicate with the SMM and the method 300 would operate in a similar manner.

The method 300 begins by checking the /SS signal level at the SMM (step 302). If the signal level is not high, then step 302 is repeated until the signal level is high. Once the signal level is high, the SMM asserts the /SS signal (step 304) and sends a command to the module (step 306). Once the SMM is finished sending the command, it will wait for the Command to Response Delay period (step 308) before continuing, as will be discussed below.

While the SMM is waiting for the Command to Response Delay period, the module receives the command from the backplane (step 310). To ensure that the command has been completely received, the module will wait for a SPI transfer timeout (STT) period. A determination is made whether the STT has expired (step 312). If the STT has not expired, then step 312 will be repeated until the STT expires. Once the STT has expired, indicating that the module has not received any data for a full STT, the module begins processing the command. If data is received during the STT, the STT is reset, so the command will only be processed when a full STT passes without receiving data.

An initial determination is made whether the address of the command matches the address of the module (step 314). If there is no address match, then this indicates that the command was intended for a different module. No further action is taken and the method terminates (step 316). If the address of the command matches the module address (step 314), then the module generates a response message (step 318) to be clocked out by the SMM. Because the SMM is the bus master, it controls the clocks on the bus and generates the clocks to extract the data out of the modules.

Once the Command to Response Delay period has passed (step 308), the SMM clocks the first four bytes of the response message out of the module (step 320). Among the first four bytes, byte 1 is the Start Byte, byte 2 is the Error Code, byte 3 is the Address, and byte 4 is the Byte Counter. The first three bytes can be checked for response validity, and the fourth byte tells the SMM how many additional bytes to clock out for the complete response message.

The SMM then clocks the remainder of the response message out of the module, based on the number of bytes indicated by the Byte Counter (step 322). Once the complete response message is received by the SMM, it deasserts the /SS signal (step 324) and the method terminates (step 316).

While specific embodiments of the present invention have been shown and described, many modifications and variations could be made by one skilled in the art without departing from the scope of the invention. The above description serves to illustrate and not limit the particular invention in any way. Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for sending a variable length response message in a master-slave communication system, comprising:
    issuing a command from a master device to a slave device;
    generating a response message in response to the command by the slave device;
    determining the length of the response message by the slave device;
    communicating the length of the response message from the slave device to the master device in response to the command;
    setting, by the master device, a number of clocks, within which the response message is received by the master device, based on the length of the response message;
    requesting the rest of the response message from the slave device by the master device; and
    sending the response message from the slave device to the master device.

2. The method according to claim 1, wherein
    the generating step includes maintaining a parameter list on the slave device, each entry in the parameter list relating to a parameter monitored by the slave device; and
    the determining step includes counting the number of parameters that have changed.

3. The method according to claim 2, wherein the determining step further includes:
    creating a bit map, each entry in the bit map corresponding to one entry in the parameter list; and
    setting a bit in the bit map if a parameter has changed, wherein the length of the response message corresponds to the number of bits set in the bit map.

4. A system for sending a variable length response message in a master-slave communication system, comprising:
    a master device configured to issue a command;
    at least one slave device, each slave device being configured to receive the command from the master device, including a parameter list for storing a list of parameters monitored by the slave device, and determining and communicating a length of a response message in response to the command which is determined by the number of parameters that have changed; and
    a clock to control retrieval of data from each slave device, the length of the response message being retrieved from a slave device before the response message is retrieved from the slave device, wherein
    the clock is configured to control time for the retrieval of the response message, within which the response message is received by the master device, based on the length of the response message.

5. The system according to claim 4, wherein each slave device further includes a bit map, each entry in the bit map corresponding to one entry in the parameter list, a bit being set if the corresponding parameter has changed, wherein the length of the response message is determined by the number of bits set in the bit map.

6. The system according to claim 4, wherein the master device includes
    a controller to control a communication bus between the master device and each slave device.

* * * * *